United States Patent
Kahn et al.

(10) Patent No.: US 7,797,552 B2
(45) Date of Patent: Sep. 14, 2010

(54) METHOD AND APPARATUS FOR CONTROLLING PAIRED OPERATION OF A CONDITIONAL ACCESS MODULE AND AN INTEGRATED RECEIVER AND DECODER

(75) Inventors: Raynold Kahn, Los Angeles, CA (US); Jordan Levy, Maaleh Adumim (IL)

(73) Assignees: The DIRECTV Group, Inc., El Segundo, CA (US); NDS Group Ltd., Middlesex (GB)

( * ) Notice: Subject to any disclaimer, the term of this patent is extended or adjusted under 35 U.S.C. 154(b) by 1330 days.

(21) Appl. No.: 10/490,261

(22) PCT Filed: Sep. 20, 2002

(86) PCT No.: PCT/US02/29881

§ 371 (c)(1),
(2), (4) Date: Aug. 5, 2004

(87) PCT Pub. No.: WO03/028287

PCT Pub. Date: Apr. 3, 2003

(65) Prior Publication Data

US 2005/0005120 A1    Jan. 6, 2005

Related U.S. Application Data

(60) Provisional application No. 60/324,211, filed on Sep. 21, 2001.

(51) Int. Cl.
*G06F 12/14* (2006.01)
(52) U.S. Cl. ...................................... 713/193
(58) Field of Classification Search .................. 713/193
See application file for complete search history.

(56) References Cited

U.S. PATENT DOCUMENTS

| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |

(Continued)

FOREIGN PATENT DOCUMENTS

EA    0002703    8/2002

(Continued)

OTHER PUBLICATIONS

Non-final Office Action dated Jan. 18, 2008 in U.S. Appl. No. 10/759,679, filed Jan. 19, 2004 by Arsenault et al.

(Continued)

*Primary Examiner*—Nasser Moazzami
*Assistant Examiner*—Michael S McNally

(57) ABSTRACT

A method and apparatus that selectively pairs a receiver (132) configured to receive a media program encrypted according to a media encryption key and a conditional access module. In one embodiment, the apparatus comprises a security module (508) for receiving and modifying the media encryption key, and a transport module (412), comprising a decryptor (524) for decrypting the media program. The media encryption key has a portion indicating a first state in which the media program is to be viewable by a set of receivers or a second state in which the media program is to be viewable only by a subset of the set of receivers.

40 Claims, 10 Drawing Sheets

U.S. PATENT DOCUMENTS

| | | | |
|---|---|---|---|
| 4,866,787 A | 9/1989 | Olesen | |
| 5,018,197 A * | 5/1991 | Jones et al. | 380/239 |
| 5,029,207 A | 7/1991 | Gammie | |
| 5,033,084 A | 7/1991 | Beecher | |
| 5,132,992 A | 7/1992 | Yurt et al. | |
| 5,164,986 A * | 11/1992 | Bright | 380/273 |
| 5,168,353 A | 12/1992 | Walker et al. | |
| 5,172,413 A | 12/1992 | Bradley et al. | |
| 5,199,066 A | 3/1993 | Logan | |
| 5,301,245 A | 4/1994 | Endoh | |
| 5,301,352 A | 4/1994 | Nakagawa et al. | |
| 5,335,277 A | 8/1994 | Harvey et al. | |
| 5,341,425 A | 8/1994 | Wasilewski | |
| 5,357,276 A | 10/1994 | Banker et al. | |
| 5,371,551 A | 12/1994 | Logan et al. | |
| 5,386,587 A | 1/1995 | Yuzawa | |
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,495,531 A | 2/1996 | Smiedt | |
| 5,506,902 A | 4/1996 | Kubota | |
| 5,557,541 A | 9/1996 | Schulhof et al. | |
| 5,565,805 A | 10/1996 | Nakagawa et al. | |
| 5,583,937 A | 12/1996 | Ullrich et al. | |
| 5,586,264 A | 12/1996 | Belknap et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,621,728 A * | 4/1997 | Lightfoot et al. | 370/397 |
| 5,640,453 A | 6/1997 | Schuchman et al. | |
| 5,642,418 A | 6/1997 | Farris et al. | |
| 5,663,896 A * | 9/1997 | Aucsmith | 713/163 |
| 5,675,390 A | 10/1997 | Schindler et al. | |
| 5,677,895 A | 10/1997 | Mankovitz | |
| 5,701,383 A | 12/1997 | Russo et al. | |
| 5,701,582 A | 12/1997 | De Bey | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,734,853 A | 3/1998 | Hendricks et al. | |
| 5,748,732 A | 5/1998 | Le Berre | |
| 5,761,302 A | 6/1998 | Park | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,790,783 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A | 11/1998 | Wharton et al. | |
| 5,845,240 A | 12/1998 | Fielder | |
| 5,850,218 A | 12/1998 | La Joie et al. | |
| 5,864,747 A | 1/1999 | Clark et al. | |
| 5,867,207 A | 2/1999 | Chaney et al. | |
| 5,899,582 A | 5/1999 | Du Lac | |
| 5,912,969 A | 6/1999 | Sasamoto et al. | |
| 5,914,941 A | 6/1999 | Janky | |
| 5,915,025 A * | 6/1999 | Taguchi et al. | 380/44 |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn | |
| 5,987,139 A * | 11/1999 | Bodin | 380/44 |
| 5,999,628 A | 12/1999 | Chan | |
| 5,999,629 A | 12/1999 | Heer et al. | |
| 6,005,937 A | 12/1999 | Lee | |
| 6,011,511 A | 1/2000 | Chuong et al. | |
| 6,025,868 A | 2/2000 | Russo | |
| 6,035,038 A | 3/2000 | Campinos et al. | |
| 6,055,314 A | 4/2000 | Spies et al. | |
| 6,055,566 A | 4/2000 | Kikinis | |
| 6,061,451 A | 5/2000 | Muratini et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,105,134 A | 8/2000 | Pinder et al. | |
| 6,144,400 A | 11/2000 | Ebisawa | |
| 6,148,081 A | 11/2000 | Szymanski et al. | |
| 6,154,206 A | 11/2000 | Ludtke | |
| 6,157,719 A | 12/2000 | Wasilewski et al. | |
| 6,157,949 A | 12/2000 | Cheng et al. | |
| 6,160,988 A | 12/2000 | Shroyer et al. | |
| 6,169,879 B1 | 1/2001 | Perlman | |
| 6,202,211 B1 | 3/2001 | Williams, Jr. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,481 B1 | 7/2001 | Lee et al. | |
| 6,286,142 B1 | 9/2001 | Ehreth | |
| 6,288,716 B1 | 9/2001 | Humpleman | |
| 6,289,455 B1 | 9/2001 | Kocher et al. | |
| 6,317,883 B2 | 11/2001 | Marics | |
| 6,317,884 B1 | 11/2001 | Eames et al. | |
| 6,363,149 B1 * | 3/2002 | Candelore | 380/45 |
| 6,370,688 B1 | 4/2002 | Hejna, Jr. | |
| 6,381,747 B1 | 4/2002 | Wonfor et al. | |
| 6,398,245 B1 | 6/2002 | Gruse et al. | |
| 6,415,031 B1 | 7/2002 | Colligan et al. | |
| 6,437,836 B1 | 8/2002 | Huang et al. | |
| 6,456,985 B1 | 9/2002 | Ohtsuka | |
| 6,466,671 B1 | 10/2002 | Mailland et al. | |
| 6,466,921 B1 | 10/2002 | Cordery et al. | |
| 6,473,858 B1 | 10/2002 | Shimomura et al. | |
| 6,476,825 B1 | 11/2002 | Croy et al. | |
| 6,480,667 B1 | 11/2002 | O'Connor | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,510,519 B2 | 1/2003 | Wasilewski et al. | |
| 6,516,465 B1 | 2/2003 | Paskins | |
| 6,519,693 B1 | 2/2003 | De Bey | |
| 6,519,772 B1 | 2/2003 | Bopardikar | |
| 6,530,085 B1 | 3/2003 | Perlman | |
| 6,542,870 B1 | 4/2003 | Matsumoto | |
| 6,550,011 B1 | 4/2003 | Sims, III | |
| 6,560,340 B1 | 5/2003 | Akins et al. | |
| 6,574,609 B1 | 6/2003 | Downs et al. | |
| 6,611,812 B2 | 8/2003 | Hurtado et al. | |
| 6,654,547 B1 | 11/2003 | Maeda et al. | |
| 6,655,580 B1 | 12/2003 | Ergo et al. | |
| 6,681,326 B2 | 1/2004 | Son et al. | |
| 6,697,489 B1 | 2/2004 | Candelore | |
| 6,748,080 B2 | 6/2004 | Russ et al. | |
| 6,772,434 B1 | 8/2004 | Godwin | |
| 6,804,357 B1 | 10/2004 | Ikonen et al. | |
| 6,848,051 B2 | 1/2005 | Wachtfogel et al. | |
| 6,853,728 B1 | 2/2005 | Kahn et al. | |
| 6,889,208 B1 | 5/2005 | Okabe et al. | |
| 6,904,522 B1 | 6/2005 | Benardeau et al. | |

| | | | |
|---|---|---|---|
| 6,961,858 B2 | 11/2005 | Fransdonk | |
| 6,993,499 B2 | 1/2006 | Gagnon et al. | |
| 7,035,827 B2 | 4/2006 | Ezaki | |
| 7,191,155 B2 | 3/2007 | Maruyama et al. | |
| 7,191,335 B1 | 3/2007 | Maillard | |
| 2001/0001876 A1 | 5/2001 | Morgan et al. | |
| 2001/0046299 A1 | 11/2001 | Wasilewski et al. | |
| 2002/0001386 A1* | 1/2002 | Akiyama | 380/201 |
| 2002/0023219 A1 | 2/2002 | Treffers et al. | |
| 2002/0056112 A1 | 5/2002 | Dureau et al. | |
| 2002/0112243 A1 | 8/2002 | Hunter et al. | |
| 2002/0170054 A1 | 11/2002 | Kudelski et al. | |
| 2003/0005285 A1 | 1/2003 | Graunke | |
| 2003/0040962 A1 | 2/2003 | Lewis | |
| 2003/0048367 A1 | 3/2003 | Rieder et al. | |
| 2003/0061477 A1 | 3/2003 | Kahn et al. | |
| 2003/0105718 A1 | 6/2003 | Hurtado et al. | |
| 2003/0110132 A1 | 6/2003 | Sako | |
| 2003/0131349 A1 | 7/2003 | Kuczynski-Brown | |
| 2003/0145183 A1 | 7/2003 | Muehring | |
| 2003/0174844 A1 | 9/2003 | Candelore | |
| 2003/0188164 A1 | 10/2003 | Okimoto | |
| 2003/0228911 A1 | 12/2003 | Dernis et al. | |
| 2004/0003079 A1 | 1/2004 | Aiu et al. | |
| 2004/0032950 A1 | 2/2004 | Graunke | |
| 2004/0073954 A1 | 4/2004 | Bjordammen et al. | |
| 2004/0102154 A1 | 5/2004 | Klauss et al. | |
| 2004/0148634 A1 | 7/2004 | Arsenault et al. | |
| 2004/0190721 A1 | 9/2004 | Barrett et al. | |
| 2005/0039025 A1 | 2/2005 | Main et al. | |
| 2005/0071280 A1 | 3/2005 | Irwin et al. | |
| 2005/0091681 A1 | 4/2005 | Borden et al. | |
| 2005/0108519 A1 | 5/2005 | Barton et al. | |
| 2005/0144468 A1 | 6/2005 | Northcutt et al. | |
| 2005/0169468 A1 | 8/2005 | Fahrny et al. | |
| 2005/0182931 A1 | 8/2005 | Robert et al. | |
| 2005/0183112 A1 | 8/2005 | Duval | |
| 2005/0235361 A1 | 10/2005 | Alkove et al. | |
| 2006/0168663 A1 | 7/2006 | Viljoen et al. | |
| 2006/0179489 A1 | 8/2006 | Mas Ribes | |

FOREIGN PATENT DOCUMENTS

| | | |
|---|---|---|
| EP | 710017 A2 | 5/1996 |
| EP | 0 936 812 A1 | 8/1999 |
| EP | 0 975 165 A2 | 1/2000 |
| EP | 0 989 557 A1 | 3/2000 |
| EP | 1122910 A1 | 8/2001 |
| EP | 1 156 676 A2 | 11/2001 |
| EP | 1 304 871 A2 | 4/2003 |
| EP | 1353511 | 10/2003 |
| EP | 1 369 152 A2 | 12/2003 |
| GB | 2354392 | 3/2001 |
| JP | 06351023 A | 12/1994 |
| JP | 11136708 A | 5/1999 |
| WO | WO 92/11713 | 7/1992 |
| WO | WO 99/18729 | 4/1999 |
| WO | WO 00/13412 | 3/2000 |
| WO | WO 00/14967 | 3/2000 |
| WO | WO 00/19294 | 4/2000 |
| WO | WO 01/22724 | 3/2001 |
| WO | WO 01/37546 | 5/2001 |
| WO | WO 01 43444 A2 | 6/2001 |
| WO | WO 01/56762 A2 * | 9/2001 |
| WO | WO 01/65762 | 9/2001 |
| WO | WO 0165762 A2 * | 9/2001 |
| WO | 0191466 A2 | 11/2001 |
| WO | WO 01/99422 | 12/2001 |
| WO | WO 02/15184 A1 | 2/2002 |
| WO | WO 02/065750 A2 | 8/2002 |
| WO | WO 2004/017637 | 2/2004 |
| WO | WO 2004/057871 | 7/2004 |

OTHER PUBLICATIONS

Notice of Allowance dated Dec. 5, 2007 in U.S. Appl. No. 09/620,833, filed Jul. 21, 2000 by Kahn et al.

Notice of Allowance dated Dec. 10, 2007 in U.S. Appl. No. 09/960,824, filed Sep. 21, 2001 by Kahn et al.

Non-final Office Action dated Dec. 4, 2007 in U.S. Appl. No. 10/758,811, filed Jan. 16, 2004 by Kahn et al.

Final Office Action dated Jan. 23, 2008 in U.S. Appl. No. 09/620,772, filed Jul. 21, 2000 by Kahn et al.

Advisory Action dated Jan. 7, 2008 in U.S. Appl. No. 10/790,466, filed Mar. 1, 2004 by Dulac, Stephen P.

"PKCS #1 v2.1: RSA Cryptography Standard"; Jun. 14, 2002; RSA Laboratories; 61 pages.

Ma, Huadong; Shin, Kang G.; "Multicast Video on Demand Services"; ACM SIGCOMM Computer Communication Review; vol. 32, Issue 1; Jan. 2002; pp. 31-43; ACM Press; New York, New York.

Tantaoui, Mounir A., Hua, Kien A., Sheu, Simon; "Interaction with Broadcast Video"; International Multimedia Conference Proceedings of the $10^{th}$ ACM International Conference on Multimedia; pp. 29-38; ACM Press; New York, New York; 2002; ISBN: 1-58113-620-X.

Griwodz, Carsten; Merkel, Oliver; Dittmann, Jana; Steinmetz, Ralf; "Protecting Vo D The Easier Way"; International Multimedia Conference Proceedings of the $6^{th}$ ACM International Conference on Multimedia; pp. 21-28; ACM Press; New York, New York; 2002; ISBN: 0-201-30990-4.

Rangan, P. Venkat, et al., "Designing An On-Demand Multimedia Service", IEEE Communications Magazine, Jul. 1992, vol. 30, No. 7, title page and pp. 56-64.

Liao, Wanjiun, et al., "The Split and Merge Protocol for Interactive Video-On-Demand", IEEE MultiMedia, Oct.-Dec. 1997, vol. 4, No. 4, index and pp. 51-62.

Johnston, Robert, et al., "A Digital Television Sequence Store", IEEE Transactions on Communications, May 1978, vol. COM-26, No. 5, index and pp. 594-600.

"Proposed SMPTE Standard for Television-Splice Points for MPEG-2 Transport Streams", SMPTE Journal, Oct. 1998, SMPTE 312M, pp. 916-925.

Robin, Michael, et al., "Digital Television Fundamentals—Design and Installation of Video and Audio Systems", McGraw-Hill, Chapter 8, title page(s) and pp. 345-425.

Li, Yongchen, et al., "Security Enhanced MPEG Player", IEEE, 1996, pp. 169-175.

Fink, Ready to take the dive? It's fast-forward as new DVD and Divx formats hit market (includes graphic: Home Video: the next generation plus: Some selections . . , York Daily Record, December . . . .

Lee, Sin-Joo, et al., "A Survey of Watermarking Techniques Applied to Multimedia", IEEE, 2001, pp. 272-277.

"PocketTV Brings Video to Palm-size PC", Mar. 9, 2000, 2 pages.

1st Report of EBU/SMPTE Task Force for Harmonized Standards for the Exchange of Television Program Material as Bit Streams, May 1997, Version 1.30, pp. 1-73.

Schneier, B, "Applied Cryptography—Protocols, Algorithms, and Source Code in C", 2nd Edition, pp. 216-222, 357-362.

HP Jornada 430/430se Palm-size PC: User's Guide, Hewlett Packard, 1999, pp. 7-9.

PocketTV-MPEG movie player for Pocket PC and WinCE, May 17, 2000, MPEG TV, LLC, retrieved from URL: http://web.archive.org/web/200006210123803/www.mpegtv.com/wince/pockettv/index.html.

Download PockeTV (beta) for WinCE, Nov. 3, 1999, MPEG TV, LLC, retrieved from URL: http://web.archive.org/web/19991127093158/www.mpegtv.com/wince/pockettv/index.html.

Anerousis, N., "SkyCast: The Satellite Digital Broadcast Relay Service", AT&T Labs Research, unpublished manuscript, 1999, pp. 1-4.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

U.S. Appl. No. 10/758,865, filed Jan. 16, 2004, Raynold M. Kahn, Non-final Office action dated Sep. 25, 2007.
U.S. Appl. No. 10/758,818, filed Jan. 16, 2004, Raynold M. Kahn, Final Rejection dated Aug. 20, 2007.
U.S. Appl. No. 10/790,466, filed Mar. 1, 2004, Stephen P. Dulac, Final Rejection dated Oct. 10, 2007.

EPO Communication dated Oct. 14, 2009 in European patent Application No. 02789163.9 filed Sep. 20, 2002 by by Raynold M. Kahn et al.

* cited by examiner

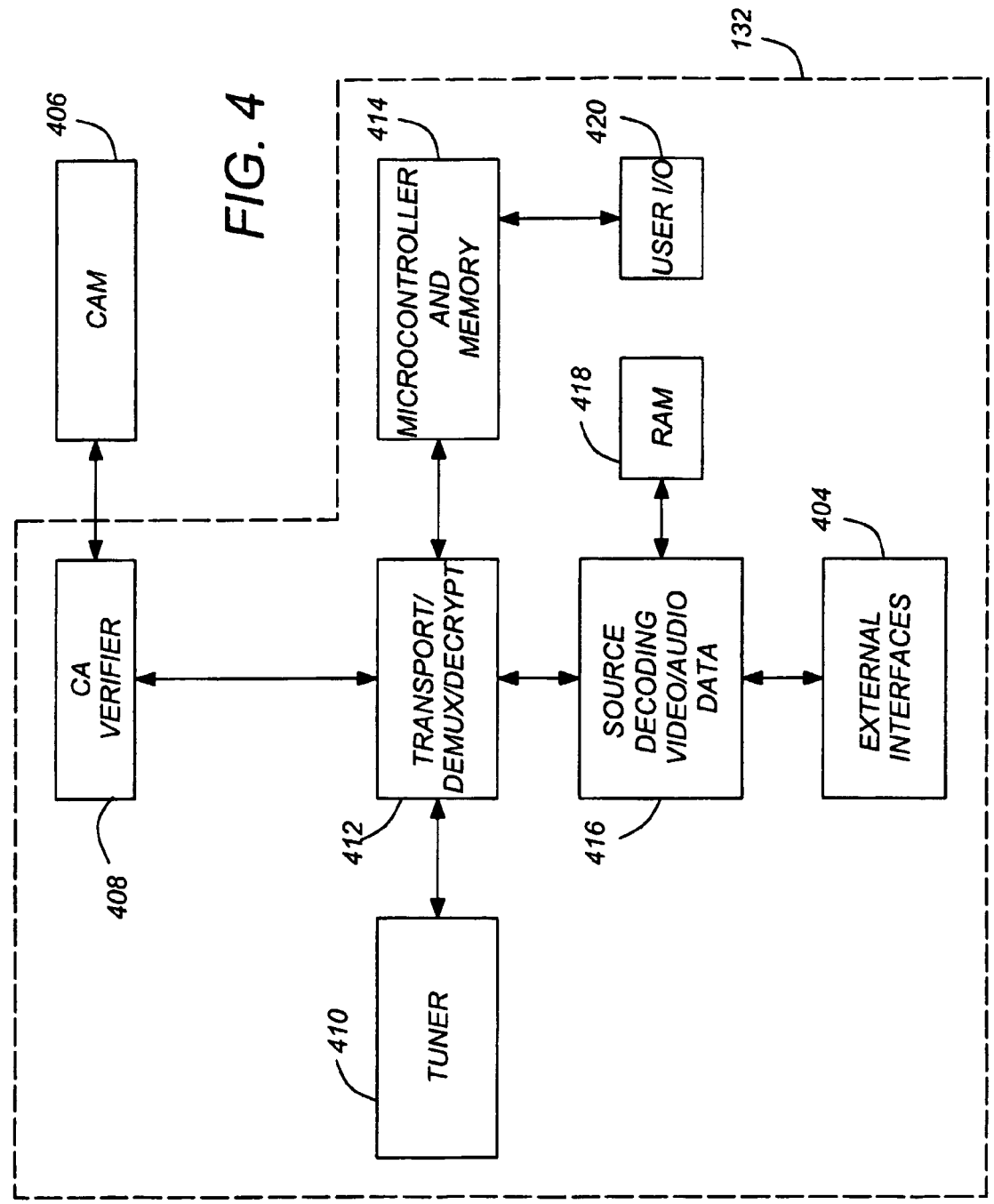

METHOD AND APPARATUS FOR CONTROLLING PAIRED OPERATION OF A CONDITIONAL ACCESS MODULE AND AN INTEGRATED RECEIVER AND DECODER

CROSS-REFERENCE TO RELATED APPLICATIONS

This application claims benefit of U.S. Provisional Patent Application No. 60/324,211, entitled "METHOD AND APPARATUS FOR CONTROLLING PAIRED OPERATION OF A CONDITIONAL ACCESS MODULE AND AN INTEGRATED RECEIVER AND DECODER," by Raynold M. Kahn and Jordan Levy, filed Sep. 21, 2001.

This application is related to the following co-pending and commonly assigned patent application(s), all of which applications are incorporated by reference herein:

Application Ser. No. 09/960,824, entitled "METHOD AND APPARATUS FOR ENCRYPTING MEDIA PROGRAMS FOR LATER PURCHASE AND VIEWING," by Raynold M. Kahn, Gregory J. Gagnon, David D. Ha, Peter M. Klauss, Christopher P. Curren, Ronald P. Cocchi, and Thomas H. James, filed Sep. 21, 2001.

This application is also related to the following applications:

application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 8, 2000, by Arthur Tilford;

application Ser. No. 09/620,772, entitled "SUPER ENCRYPTED STORAGE AND RETRIEVAL OF MEDIA PROGRAMS WITH SMARTCARD GENERATED KEYS", filed Jul. 21, 2000, by Raynold M. Kahn et al.;

application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY", filed Jul. 21, 2000, by Raynold M. Kahn et al., now issued Apr. 10, 2007 as U.S. Pat. No. 7,203,314;

application Ser. No. 09/620,832, entitled "VIDEO ON DEMAND PAY PER VIEW SERVICES WITH UNMODIFIED CONDITIONAL ACCESS FUNCTIONALITY", filed Jul. 21, 2000, by Raynold M. Kahn et al., now issued Feb. 8, 2005 as U.S. Pat. No. 6,853,728;

application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

application Ser. No. 10/758,865 entitled "DISTRIBUTION OF VIDEO CONTENT USING CLIENT TO HOST PAIRING OF INTEGRATED RECEIVERS/DECODERS", filed Jan. 16, 2004, by Raynold M. Kahn et al;

application Ser. No. 10/759,679 entitled "VIRTUAL VIDEO ON DEMAND USING MULTIPLE ENCRYPTED VIDEO SEGMENTS", filed Jan. 19, 2004, by Robert G. Arsenault et al., which is a continuation of application Ser. No. 09/491,959, entitled "VIRTUAL VIDEO ON DEMAND USING MULTIPLE ENCRYPTED VIDEO SEGMENTS", filed Jan. 26, 2000, by Robert G. Arsenault et al., now issued Mar. 2, 2004 as U.S. Pat. No. 6,701,528;

application Ser. No. 10/790,466 entitled "VIDEO ON DEMAND IN A BROADCAST NETWORK", filed Mar. 1, 2004, by Stephen P. Dulac;

application Ser. No. 11/433,926 entitled "METHODS AND APPARATUS TO PROTECT CONTENT IN HOME NETWORKS", filed May 15, 2006, by Raynold M. Kahn;

application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

application Ser. No. 11/434,082 entitled "CONTENT DELIVERY SYSTEMS AND METHODS TO OPERATE THE SAME", filed May 15, 2006, by Raynold M. Kahn et al.;

application Ser. No. 11/434,404 entitled "SECURE CONTENT TRANSFER SYSTEMS AND METHODS TO OPERATE THE SAME", filed May 15, 2006, by Raynold M. Kahn et al;

application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

application Ser. No. 11/434,528 entitled "METHODS AND APPARATUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et al.;

application Ser. No. 11/499,635 entitled "DISTRIBUTED MEDIA-PROTECTION SYSTEMS AND METHODS TO OPERATE THE SAME", filed Aug. 4, 2006, by Michael Ficco;

application Ser. No. 11/499,636 entitled "DISTRIBUTED MEDIA-AGGREGATION SYSTEMS AND METHODS TO OPERATE THE SAME", filed Aug. 4, 2006, by Michael Ficco;

application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.;

application Ser. No. 11/654,752 entitled "SECURE STORAGE AND REPLAY OF MEDIA PROGRAMS USING A HARD-PAIRED RECEIVER AND STORAGE DEVICE", filed Jan. 18, 2007, by Raynold M. Kahn et al., which is a continuation of application Ser. No. 09/620,833, entitled "SECURE STORAGE AND REPLAY OF MEDIA PROGRAMS USING A HARD-PAIRED RECEIVER AND STORAGE DEVICE", filed Jul. 21, 2000, by Raynold M. Kahn et al.; and application Ser. No. 11/701,800 entitled "SUPER ENCRYPTED STORAGE AND RETRIEVAL OF MEDIA PROGRAMS IN A HARD-PAIRED RECEIVER AND STORAGE DEVICE", filed Feb. 2, 2007, by Raynold M. Kahn et al., which is a continuation of application Ser. No. 09/621,476, entitled "SUPER ENCRYPTED STORAGE AND RETRIEVAL OF MEDIA PROGRAMS IN A HARD-PAIRED RECEIVER AND STORAGE DEVICE", filed Jul. 21, 2000, by Raynold M. Kahn et al., now issued Apr. 10, 2007 as U.S. Pat. No. 7,203,311.

BACKGROUND OF THE INVENTION

1. Field of the Invention

The present invention relates to systems and methods for providing video program material to subscribers, and in particular to a method and system for securely delivering a video program decryption key from a smart card to the receiver.

2. Description of the Related Art

Cable and satellite television services have become commonplace. Systems have been designed to assure that only paying subscribers receive media programs transmitted by cable and satellite television providers. Among such systems are those which use a conditional access module (typically in the form of a smart-card) that can be removably inserted into the receiver. It is desirable to have a means to pair the receiver and the conditional access module. Receiver-conditional access module pairing may be strong (e.g. via exchanging and using keys), but there are circumstances in which it is desirable to remotely control such pairing.

For example, it may be desirable to allow information on promotional channels (channels which present promotional material describing media programs available on other channels) to be received without strongly pairing the receiver and the conditional access module. At the same time, this capability should not create a means whereby strong pairing can be bypassed, on channels where strong pairing is required.

Further, although the receiver and the conditional access module may be strongly paired (e.g. by exchanging and sharing pairing keys) receivers may be manufactured and distributed at a time when conditional access modules supporting such features are unavailable or vice-versa.

Also, it may be desirable to occasionally change the keys that enforce pairing between the receiver and the conditional access module, and the ability to selectively and remotely pair the conditional access module and the receiver to assure that all receivers are functioning properly while transitioning between pairing key generations. During pairing key transitions, the strong pairing functions may be performed by receivers using the either the old pairing key or the new pairing key, but after the transition is complete, use of the new pairing key may be enforced. By this means, strong pairing can be effectively terminated for receivers and conditional access modules that are no longer authorized, by not including these receivers in the new pairing key delivery group. Moreover, by selectively enforcing the new pairing key group, on a per-channel basis, it is possible to slowly roll out the customer service impact of the transition, due to legitimate customers that have not received their new pairing key.

What is needed is a system and method that achieves the foregoing objectives. The present invention satisfies this need.

SUMMARY OF THE INVENTION

In summary, the present invention describes a system and method for selectively pairing a receiver configured to receive a media program encrypted according to a media encryption key and a conditional access module. In one embodiment, the method comprises the steps of receiving a media encryption key that is not encrypted by a pairing key, the media encryption key having a pairing portion indicating a first state in which the media program is to be viewable by all receivers or a second state in which the media program is to be viewable only by receivers paired with the conditional access module; decrypting the media program according to the received media encryption key if the pairing portion indicates the first state; and modifying the received media encryption key and decrypting the media program according to the modified media encryption key if the pairing portion indicates the second state. In another embodiment, the method comprises the steps of receiving a media encryption key encrypted by a pairing key, the media encryption key having a pairing portion indicating a first state in which the media program is to be viewable by all receivers paired with the conditional access module by way of a shared pairing key, or a second state in which the media program is to be viewable only by receivers paired with the conditional access module by way of a shared pairing key having a pairing section indicating membership in a specific pairing key subgroup; decrypting the media encryption key according to the pairing key; decrypting the media program according to the decrypted media encryption key if the pairing portion of the media encryption key indicates the first state; and modifying the decrypted media encryption key in accordance with the pairing section of the pairing key and decrypting the media program according to the modified decrypted media encryption key if the pairing of the media encryption key portion indicates the second state. In another embodiment, the method comprises the steps of transmitting a pairing key encrypted according to an I/O indecipherable algorithm implemented in the conditional access module; and transmitting a media encryption key, the media encryption key having a pairing portion indicating a first state in which the media program is to be viewable by all receivers or a second state in which the media program is to be viewable by receivers paired with the conditional access module.

The invention is also described by an apparatus that selectively pairs a receiver configured to receive a media program encrypted according to a media encryption key and a conditional access module. In one embodiment, the apparatus comprises a security module, for receiving a media encryption key that is not encrypted by a pairing key from the conditional access module, wherein the media encryption key has a pairing portion indicating a first state in which the media program is to be viewable by all receivers or a second state in which the media program is to be viewable only by receivers paired with the conditional access module; and a translator module, comprising a decryptor for decrypting the media program according to the received media encryption key if the pairing portion indicates the first state and for decrypting the media program according to the modified media encryption key if the pairing portion indicates the second state. The security module includes a module for modifying the received media encryption key if the pairing portion indicates the second state. In another embodiment, the apparatus comprises a security module, for receiving a media encryption key encrypted by a pairing key from the conditional access module, wherein the media encryption key has a pairing portion indicating a first state in which the media program is to be viewable by all receivers paired with the conditional access module by way of a shared pairing key, or a second state in which the media program is to be viewable only by receivers paired with the conditional access module by way of a shared pairing key having a pairing section indicating membership in a specific pairing key subgroup; and a translator module, comprising a decryptor for decrypting the media program according to the decrypted media encryption key if the pairing portion indicates the first state and for decrypting the media program according to the modified media encryption key if the pairing portion indicates the second state. The security module includes a decryptor for decrypting the encrypted media encryption key according to the pairing key; and a module for modifying the decrypted media encryption key in accordance with the pairing section of the pairing key if the pairing portion indicates the second state. In another embodiment, the apparatus comprises a transmitter for transmitting a pairing key and a media encryption key, wherein the pairing key is encrypted according to an I/O indecipherable algorithm implemented in the conditional access module; and the media encryption key includes a pairing portion indicating a first state in which the media program is to be viewable by all receivers or a second state in which the media program is to be viewable by receivers paired with the conditional access module.

BRIEF DESCRIPTION OF THE DRAWINGS

Referring now to the drawings in which like reference numbers represent corresponding parts throughout:

FIG. 4 is a block diagram illustrating a high-level block diagram of the IRD.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

MEDIA PROGRAM DISTRIBUTION SYSTEM

Figure 1:
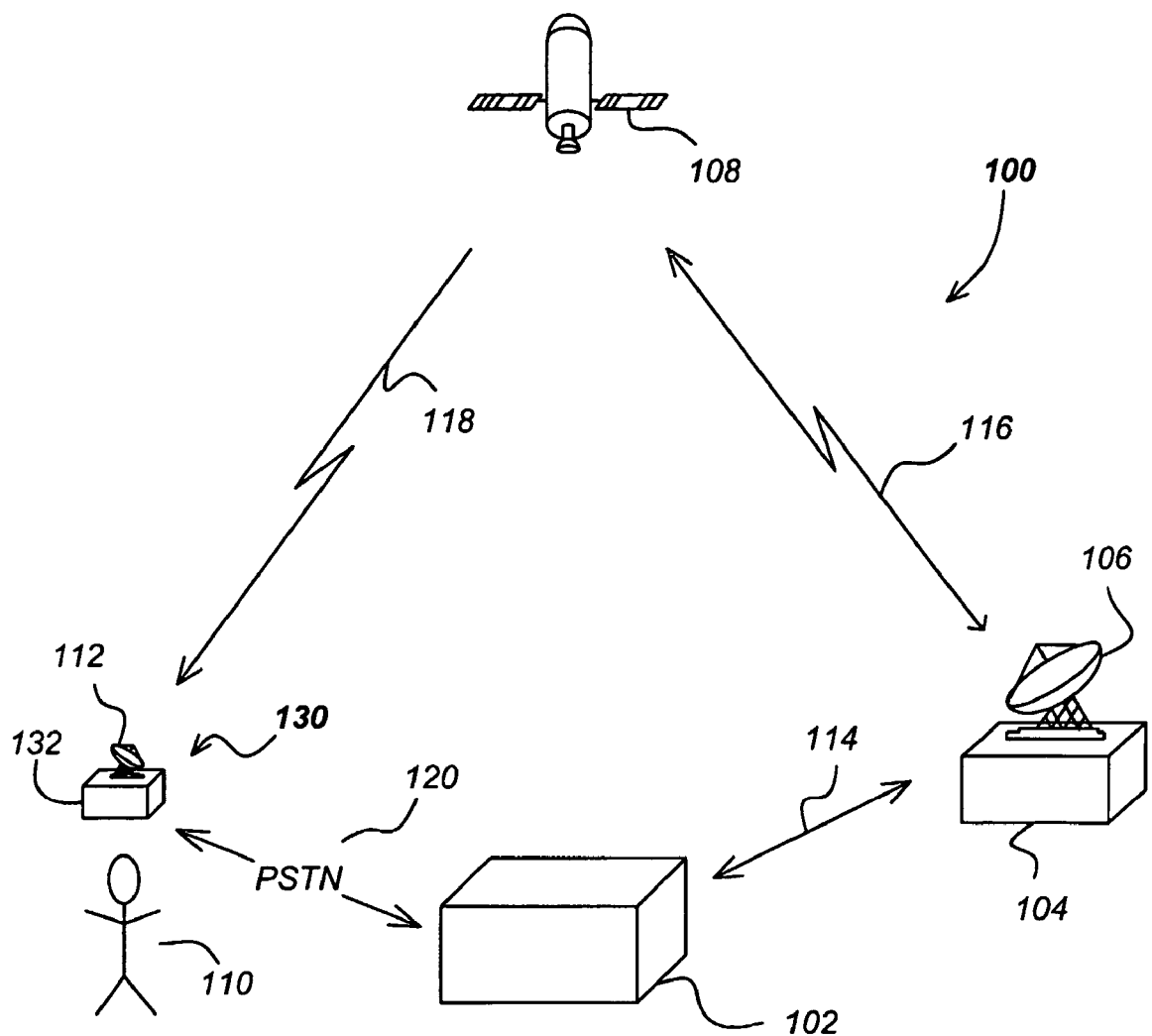
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other communication link 120. The control center 102 provides program material to the uplink center 104, coordinates with the receiver station 130 to offer subscribers 110 media programs including pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using the subscriber antenna 112, to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information, or any other kind of data as well.

Figure 2:
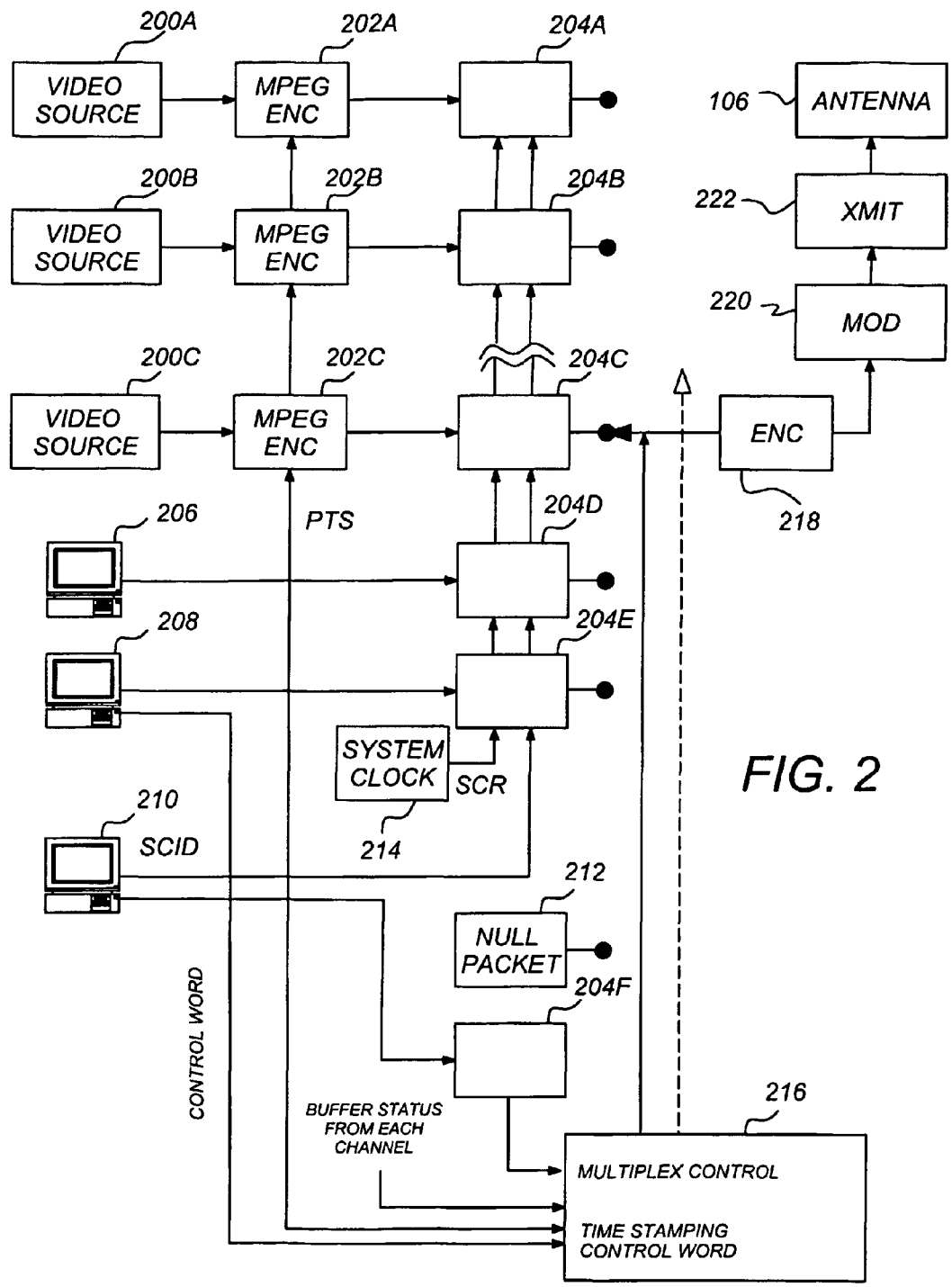
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
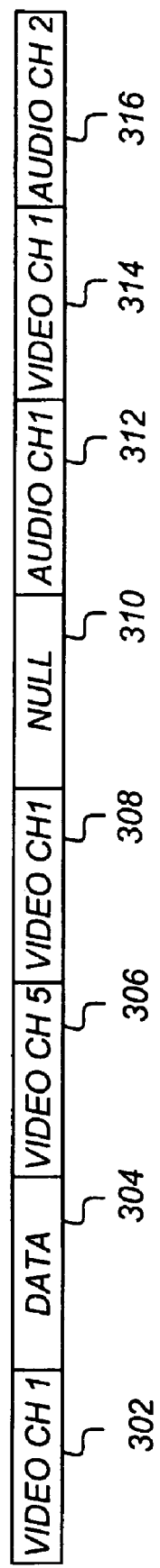
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
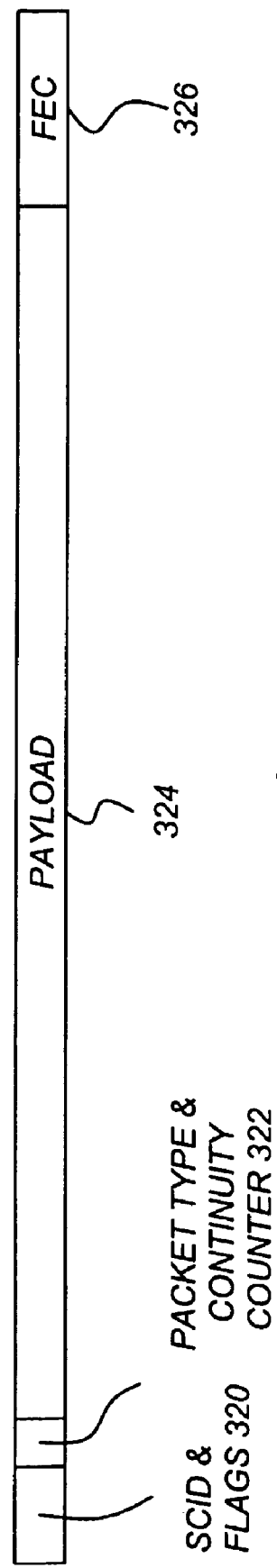
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including symmetric algorithms such as the data encryption standard (DES) and asymmetric algorithms such as the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the encrypted CWP to retrieve the CW. Then, using the CW, the IRD 132 can decrypt the media program so that it can be presented to the subscriber 110.

Pay-Per-View Services

The data required to receive and view pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Reception and Decryption of Live Media Programs

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner 410 receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, a computer, or a media storage device such as a hard drive. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

Further details regarding the encryption and decryption of media programs can be found in co-pending and commonly assigned U.S. patent application Ser. No. 09/491,959, which is hereby incorporated by reference herein.

Pairing the Conditional Access Module and the IRD

To discourage piracy, the present invention operatively pairs the conditional access module (CAM) 406 and the IRD 132 so that each IRD 132 will only operate with the designated CAM 406 and each CAM 406 will only operate with the designated IRD 132. This is accomplished by encrypting communications between the CAM 406 and the IRD 132 according to a pairing key that is generated from a secret receiver key in the IRD 132.

Figure 5:
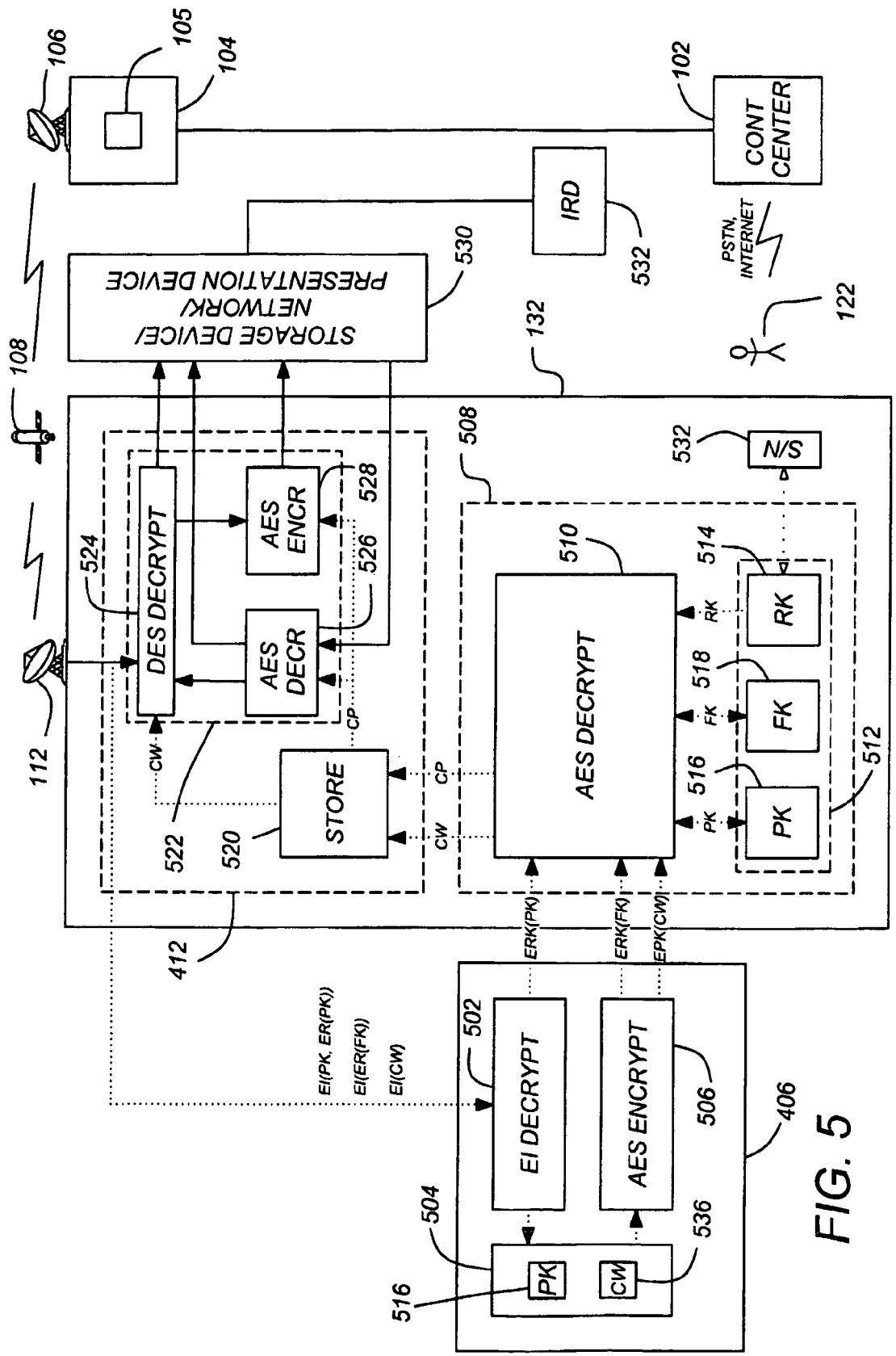
FIG. 5 is a diagram showing the functional relationship between the conditional access module, the IRD, and the security and transport chips therein.

FIG. 5 is a functional block diagram of a paired CAM 406 and IRD 132. The CAM 406 includes a decryptor 502, an encryptor 506 (hereinafter also referred to as AES encryptor) and a secure memory 504 having storage for a pairing key 516 and a control word (CW) 536. In one embodiment, the encryptor 506 is an advanced encryption standard (AES) encryptor, but other encryption schemes and algorithms can also be used.

The IRD 132 includes the transport module 412 and a security module 508. The transport module 412 and the security module 508 can be implemented on an integrated circuit (IC) separate from other circuits in the IRD 132, and sealed to prevent tampering. The transport module 412 and the security module 508 can be implemented in separate ICs or in the same IC.

The security module 508 includes a decryptor 510, which decrypts communications transmitted from the conditional access module 406, and provides the results of these decrypted communications to the transport module 412. The decryptor 510 can also encrypt or otherwise combine content information and copy control information with the family key 518 to produce a copy protection key (CP) as described in co-pending and commonly assigned U.S. patent application Ser. No. 09/960,824, which is hereby incorporated by reference herein. The decryptor 510 can be implemented in separate modules for encrypting and decrypting, if desired.

The security module 508 includes a memory 512 for storing keys and other information. In one embodiment, the memory 512 is tamper-proof in that the contents of the memory 512 cannot be read and presented externally to the security module 508 (e.g. the contents are user-unreadable). This feature prevents compromise of the keys stored in the memory 512. The memory 512 may also be volatile memory.

In one embodiment, the security module 508 places the control words (CW) into a CW cache of the transport module 412 via direct memory access (DMA). It is therefore impossible to output or input the CWs via a system bus. Since the encrypted control word can only be decrypted by the receiver 132 that contains the appropriate receiver key 514, this cryptographically binds ("pairs") the CW output of the CAM 406 to the security module 508.

Keys that may be stored in the memory 512 include, for example, a pairing key 516, a family key 518, and a receiver key 514. In one embodiment of the invention, the receiver key 514 is provided pre-installed in the security module 508 (and hence, with the IRD 132) when the IRD 132 is provided to the subscribing user. Preferably, the receiver key 514 is user-unreadable, is unique to the IRD 132, and is uniquely associated with the serial number 532.

The decryptor 510 transmits decrypted control words and copy protection (CP) session keys to the transport module 412 where the keys may be temporarily stored for later use. The decrypted control words (CW) are provided to a first transport chip decryptor 524 to allow the media program stream to be decrypted. The resulting decrypted media program stream can be provided to a presentation device (such as a television, monitor, computer, or audio system), a storage device (such as a read/writable CDROM or DVD or a hard drive), or a network for viewing or storage elsewhere.

In one embodiment, the IRD 132 is communicatively coupled to a second IRD 532 (hereinafter alternatively referred to as a "daughter IRD"). The daughter IRD can be used to request media programs that are received or reproduced by the IRD 132, thus allowing media programs to be reproduced at other locations in the home. Preferably, the daughter IRDs 532 do not include long-term storage capacity (e.g. no hard disk), so the daughter IRDs request the storage and retrieval of media programs from the IRD 132. Daughter IRDs 532 can be communicatively coupled to the primary or master IRD 132 via any communication link, including a direct coaxial connection, or via a local area network (LAN) or other digital communication medium.

Returning to the transport module 412 of FIG. 5, the CP key is used by the decryptor 526 and encryptor 528 to encrypt and decrypt data that is stored and retrieved from the storage device or network 530.

One feature of the present invention is that it allows for pairing of the conditional access module 406 and the IRD 132, thus preventing any conditional access module 406 to be used with any IRD 132.

The control center 102 can elect to change the pairing key (PK) as desired. This can be scheduled to occur randomly as a security precaution or to revoke a user's rights to use the IRD 132, as described below Controlling Paired and Unpaired Operation The foregoing provides a description of a security system and method in which the CAM 406 is strongly paired to the IRD 132 via the use of a secure key (e.g., the pairing key PK) to prevent piracy. Further, as described above, pairing keys may be changed occasionally, in order to revoke operation for receivers that are no longer authorized for service. This invention discloses a means and apparatus to enforce a specific generation of pairing keys, to prevent further paired operation using the old generation of pairing keys. This invention also discloses a means and apparatus to control the enforcement of strong pairing, so as to selectively allow multiple generations of pairing keys to be used to assure that all IRDs 132 are functional while transitioning between generations of pairing keys.

Under some circumstances, it is desirable to allow the CAM 406 and the IRD 132 to be used together either unpaired or weakly paired. For example, promotional channels (channels which present promotional material describing media programs available on other channels) must typically be scrambled before the CAM 106 and the IRD 132 are activated. It is also possible that IRDs 132 with the foregoing advanced security features will be manufactured and distributed before CAMs 406 supporting such features are available. In such case, the legacy form of weak pairing may be used, where the CW is encrypted by CAM 406 using a less secure form of encryption or pairing key, and where the IRD 132 software decrypts the CW. From the perspective of the transport module 412 and the security module 508, unpaired and weakly paired (legacy) modes are identical, because the IRD 132 software obtains the necessary CW, and loads it unencrypted into the transport module 412.

The capability to indicate and control whether the CAM 406 and the IRD 132 are strongly paired, weakly paired, or unpaired, is vested in control center 102. The control center 102 uses a transmission of information, either over-the-air (e.g. via links 116 and 118) or ground link (e.g. via PSTN or similar link 120) to signal the IRD 132 software and/or CAM (on a network or per-channel basis) whether strong CAM-IRD pairing is required for the control word (CW).

Such pairing information may take the form of flags and fields in the CWP to indicate whether pairing is required, whether strong pairing is required, whether strong pairing is enforced, and an index of the generation of strong pairing keys. In one embodiment, these flags and fields may be duplicated in sections of the CWP intended for the IRD 132 and in sections of the CWP intended for the CAM 406; in another embodiment this information may be delivered to the IRD 132 only, and then the desired mode conveyed to the CAM 406 by the IRD 132; in yet another embodiment the CAM 406 may convey this information to the IRD 132, if delivered to the CAM 406 alone. Besides selecting which pairing mode is required, this information may also be used by the CAM 406 or IRD 132 to trigger on-screen error messages if the condition is not satisfied (for example, if the required pairing key generation has not been received.)

Enforcing Paired and Unpaired Operation

The foregoing describes the delivery of information indicating whether unpaired, weak or strong pairing, is required, and which pairing key to use. The following discloses a means and apparatus for selectively enforcing these modes, by ensuring that the media content is incorrectly decrypted if the enforced condition is violated. The enforcement is carried out in the security module 508 by selectively modifying the CW prior to delivery to the transport module 412, based on enforcement fields embedded in the CW and PK.

The enforcement fields are inserted during the key generation process at the headend. This insertion process may be managed and controlled by the control center 102.

As suggested in the foregoing section, the pairing mode indicated by the control information may or may not be enforced, depending the desired operational scenario. When enforcement it not triggered, flexibility is permitted in operational modes, to allow for transitions in operation without undue customer service impact. When enforcement is triggered, a specific generation of strong pairing key is required. Since the CW modification is performed by the security module 412, strong pairing will be enforced even in the extreme case where the IRD software has been altered in an attempt to facilitate signal piracy.

Figure 6:
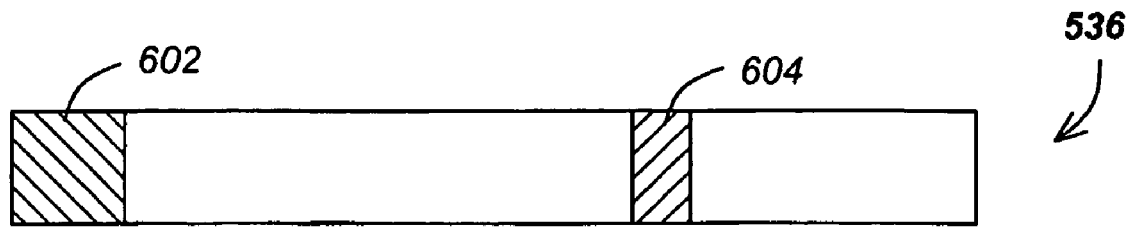
FIG. 6 is a diagram illustrating one embodiment of the structure of the control word.

FIG. 6 is a diagram illustrating one embodiment of the structure of the media encryption key, or CW 536. The CW 536 comprises a first portion 602 and a second (e.g. pairing) portion 604 that can be used to trigger whether strong pairing is enforced (e.g. whether the media program associated with the CW 600 is to be viewable only by receivers 132 paired with the appropriate conditional access module 406 and the appropriate generation of Pairing Key (PK) 516).

Figure 7:
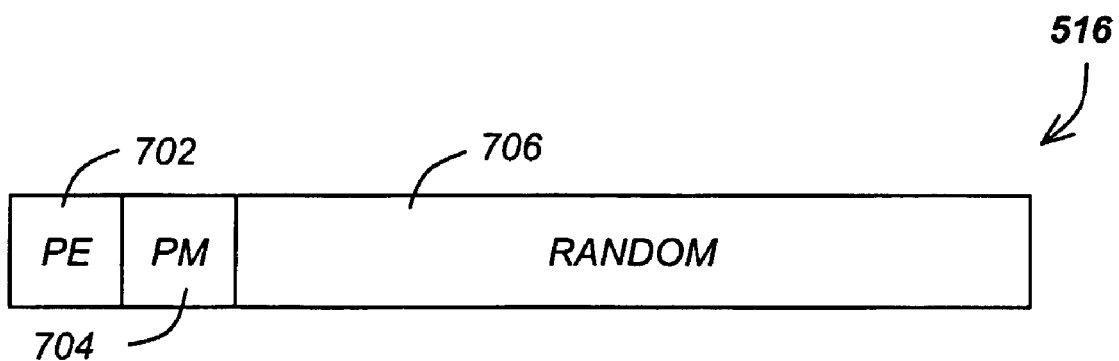
FIG. 7 is a diagram illustrating one embodiment of the structure of the pairing key.

FIG. 7 is a diagram illustrating one embodiment of the structure of the pairing key (PK) 516. The pairing key (PK) 516 includes a first portion 702 and a second portion 704. In one embodiment, the first portion is a pairing epoch (PE) 702, and the second portion is a pairing mask (PM) 704, both of which are further described below.

Figure 8:
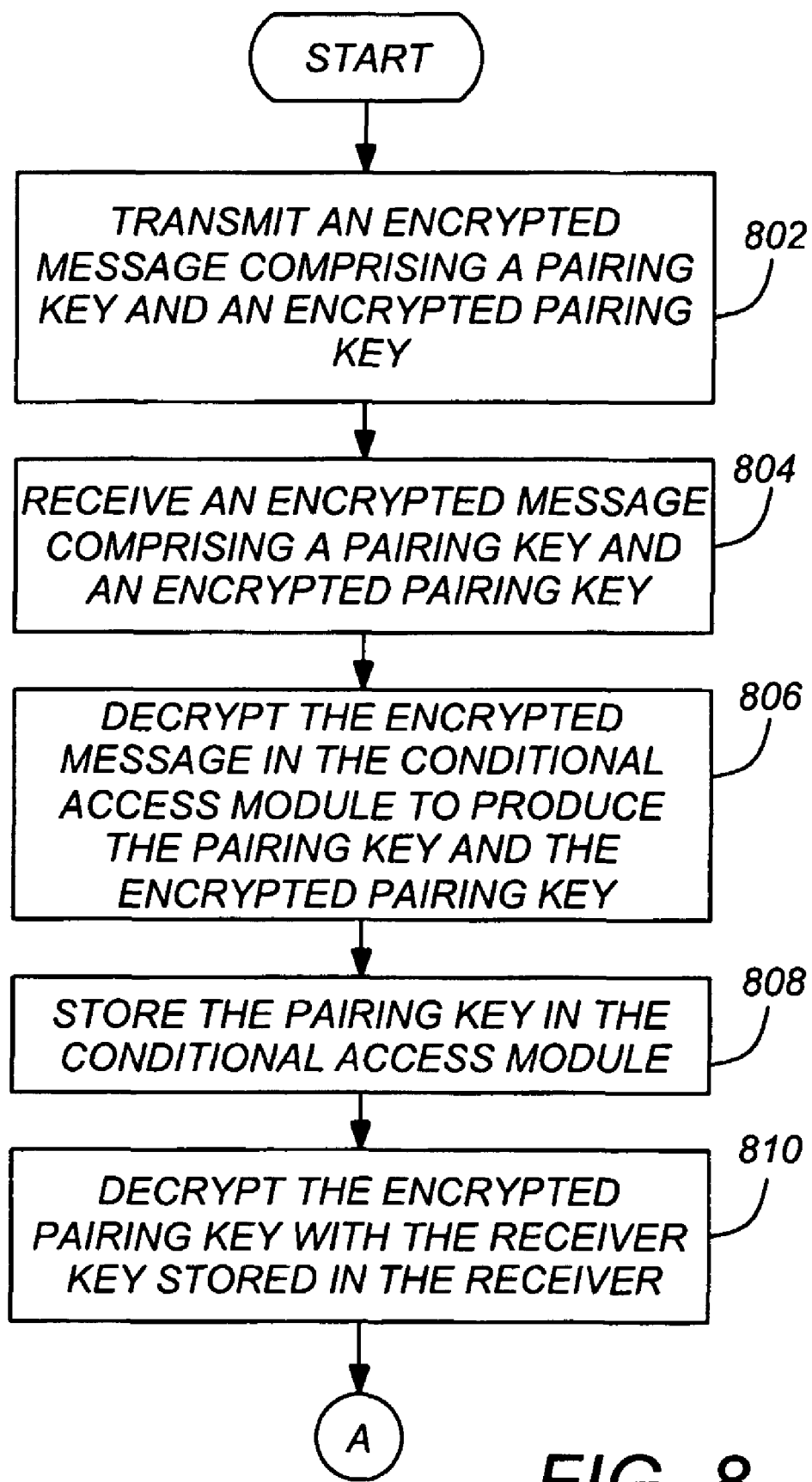
FIG. 8 is a flow chart describing exemplary steps performed in transmitting the pairing key to the IRD.

FIG. 8 is a flow chart describing exemplary steps performed in selectively enforcing the pairing between the CAM 406 and the IRD 132. An encrypted message comprising the pairing key 516 and an encrypted pairing key is transmitted by the video distribution system 100 elements and received by the receiver 132, as shown in blocks 802 and 804. The encrypted message is decrypted by the CAM 406 to produce the pairing key 516 and a pairing key 516 encrypted according to the receiver key 532, and stored in the conditional access module 808, as shown in blocks 806 and 808. In one embodiment, the message is encrypted according to the I/O indecipherable algorithm by the CAM 406. The encrypted version of the pairing key is then transmitted to the security module 508 in the IRD 132. The security module 508 decrypts the encrypted pairing key 516 using the receiver key 532, and stores the pairing key 516 in a secure memory 512 in the security module 508.

Figure 9A:
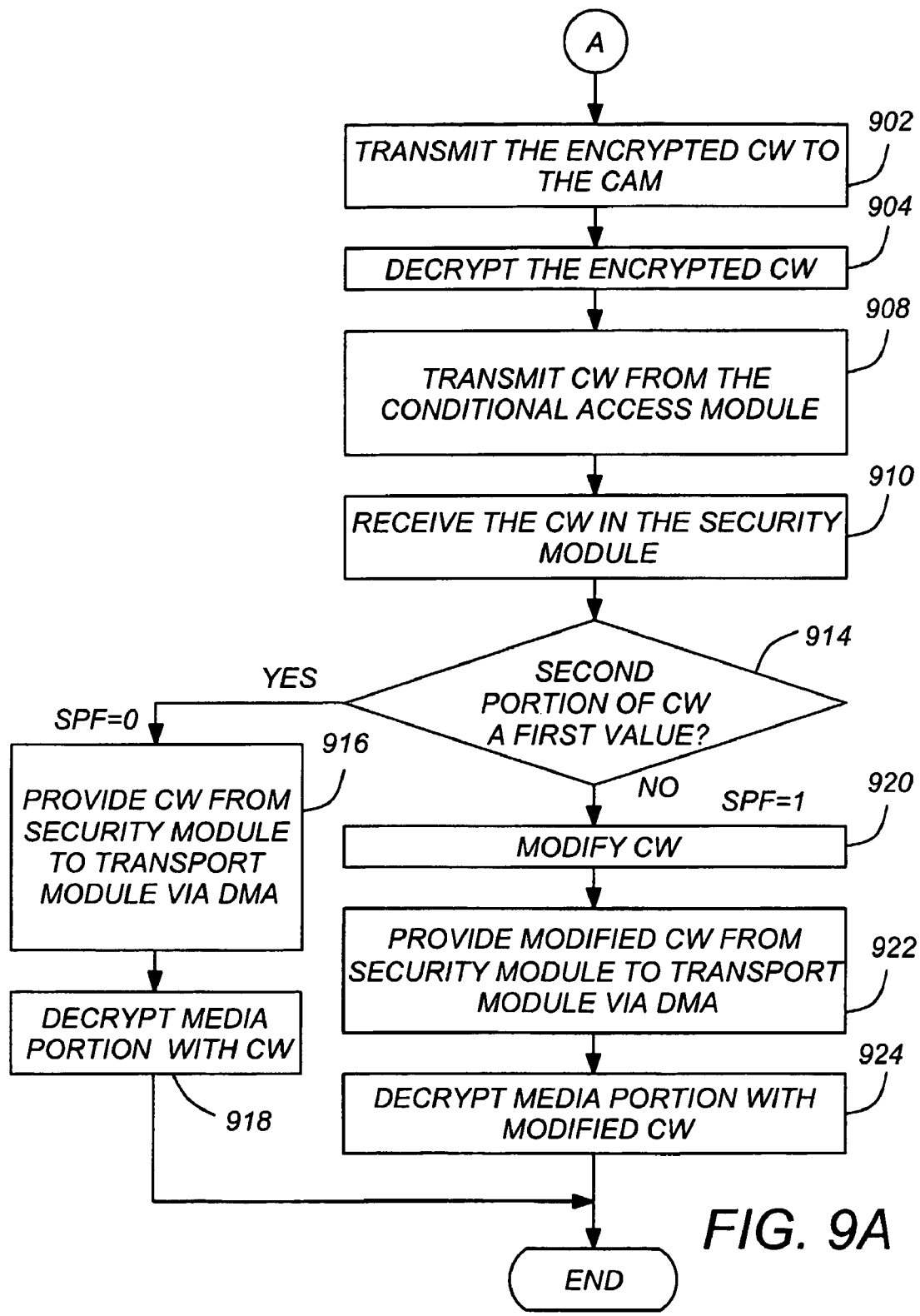
FIG. 9A is a flow chart describing exemplary steps performed in selectively allowing unpaired operation between the CAM and the IRD.

FIG. 9A is a flow chart describing exemplary steps performed in allowing unpaired operation between the CAM 406 and the IRD 132 (the unpaired mode of the security module is selected). The video distribution system 100 elements transmit the encrypted CW 536 to the CAM 406 (via the IRD tuner 410 and associated components), as shown in block 902. As shown in block 904, the CAM 406 then decrypts the encrypted CW 536 using the I/O indecipherable algorithm.

The decrypted CW 536 is transmitted from the CAM 406, and received in the security module 508, as shown in blocks 908 and 910.

In block 914, the second portion 604 of the CW 536 is examined. If the second portion 604 is a first value (i.e. a value indicating that strong pairing is not enforced, and that unpaired operation is permissible so that all IRDs 132 should receive the media program), the CW 536 is provided from the security module 512 to the transport module 412 via DMA to permit the media program (received in the transport module directly) to be decrypted and viewed. This is illustrated in blocks 916 and 918. If the second portion 604 is a second value (i.e. a value indicating that strong pairing is enforced, and therefore the requested unpaired operation is not permitted), the CW 536 is modified as shown in block 920. The CW 536 is modified by changing the value of the second portion 604 from the second value to the first value (e.g. 0) or another value. In block 922, the modified CW 536 is provided from the security module 508 to the transport module 412. Ordinarily, providing the CW 536 to the transport module 412 would enable the transport module 412 to decrypt the media portion, but due to the modification, the media portion is not properly decrypted, and the media program cannot be viewed. In one embodiment of the invention, a particular CW is associated with only a portion of the media program, and several CWs are required to decrypt the entire media program. For example, the CW can change every 20 seconds, or at another frequency.

In the embodiment illustrated in FIG. 9A, when the security module 580 processes an unencrypted CW 536 and the second portion 604 is set to a first value (channel operating in a non-paired or weakly paired mode), the CW 536 is simply provided to an output register for use by the transport module 412. However, when pairing is required, control center 102 sets the second portion 604 of the CW 536 to a different value. Since that value is modified to a different value by the operations in block 920 of FIG. 9A, the resulting CW 536 will not decrypt the media program, and an attempt by a non-paired (non-authorized) CAM 406 or compromised IRD 132 software to bypass strong pairing will be unsuccessful.

Figure 9B:
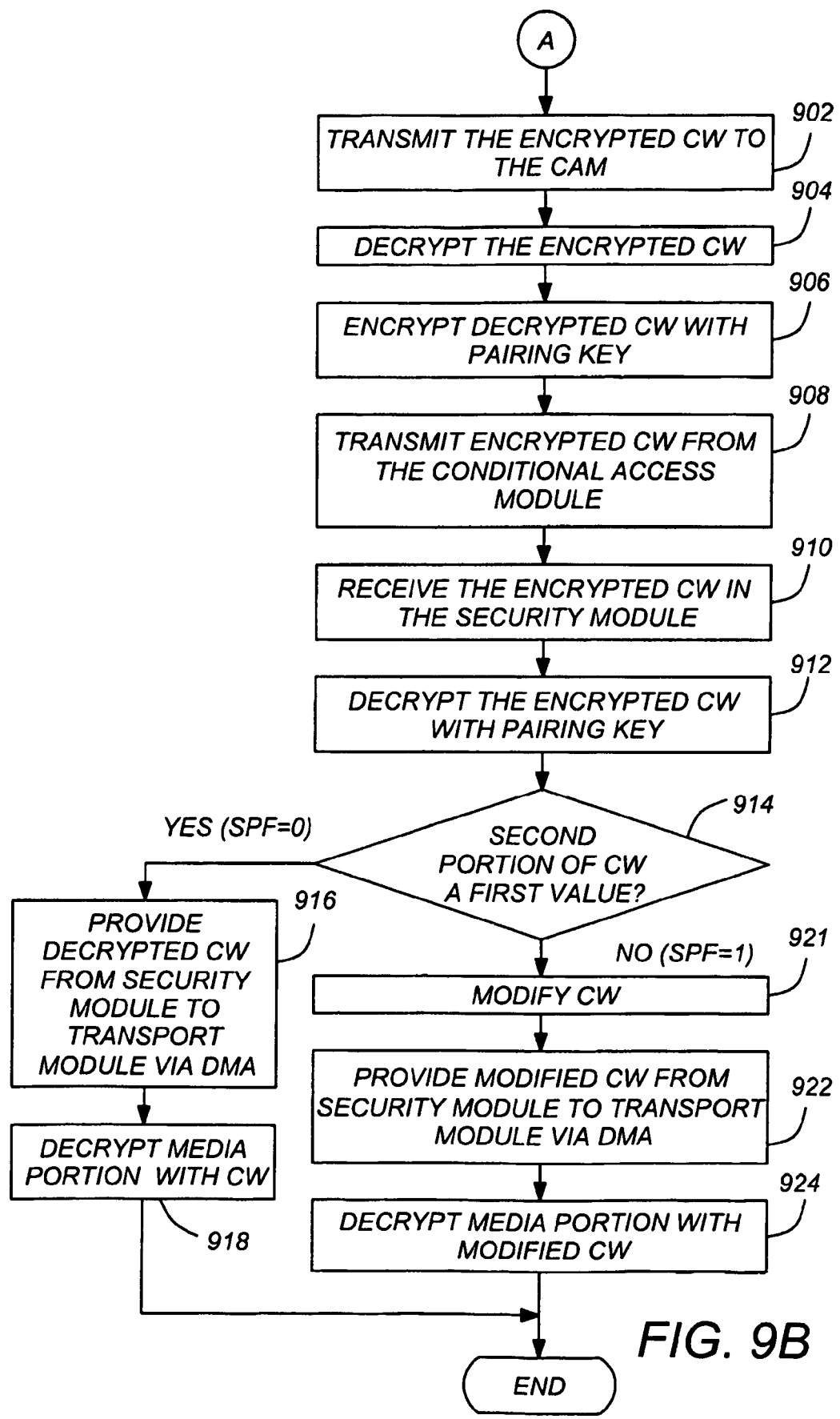
FIG. 9B is a flow chart describing exemplary steps performed in selectively enforcing a specific pairing between the CAM and the IRD.

FIG. 9B is a flow chart describing exemplary steps performed in selectively enforcing a specific pairing between the CAM 406 and the IRD 132. This embodiment applies when the subscribers' CAMs 406 and IRDs 132 are paired, but only a subset of the paired CAM/IRD 406/132 combinations are permitted to decode the media program.

The video distribution system 100 elements transmit the encrypted CW 536 to the CAM 406 (via the IRD tuner 410 and associated components), as shown in block 902. As shown in block 904, the CAM 406 then decrypts the encrypted CW 536 using the I/O indecipherable algorithm.

In this mode, the strong paired mode of the security module is selected, and hence, as shown in blocks 904 and 908, the decrypted CW 536 is encrypted with the pairing key 516 before being transmitted from the CAM 406. The encrypted CW 536 is then received in the security module 508, as shown in block 910. Using the pairing key 516 stored in the secure memory 512, the security module decrypts the encrypted CW 536. Note that this step is only possible if the security module 508 and the CAM 406 are strongly paired, i.e. share a common PK 516.

In block 914, the second portion 604 of the CW 536 is examined. If the second portion 604 is a first value (e.g. a value indicating strong pairing is not enforced, and that all strongly paired IRDs 132 should receive the media program), the CW 536 is provided from the security module 512 to the transport module 412 via DMA to permit the media program (received in the transport module directly) to be decrypted and viewed. This is illustrated in blocks 916 and 918. If the second portion 604 is a second value (i.e. a value indicating strong pairing enforcement and that only a subset of strongly paired IRDs 132 should receive the media program), the CW 536 is modified at least in part, according to the pairing key, and the modified CW 536 is provided from the security module 508 to the transport module 412, allowing the media portion to be decrypted, as shown in blocks 921-924. In one embodiment of the invention, a particular CW is associated with only a portion of the media program, and several CWs are required to decrypt the entire media program. For example, the CW can change every 20 seconds, or at another frequency.

In one embodiment, the transport module 412 is configured such that no module in the IRD 132 can write directly to the CW registers (in storage 520) except for the security module 508. Therefore, all CWs 536 must be from the security module 508, whether strong pairing is implemented or not. The second portion 604 of the CW 536 may be implemented as a strong pairing flag (SPF).

Figure 10:
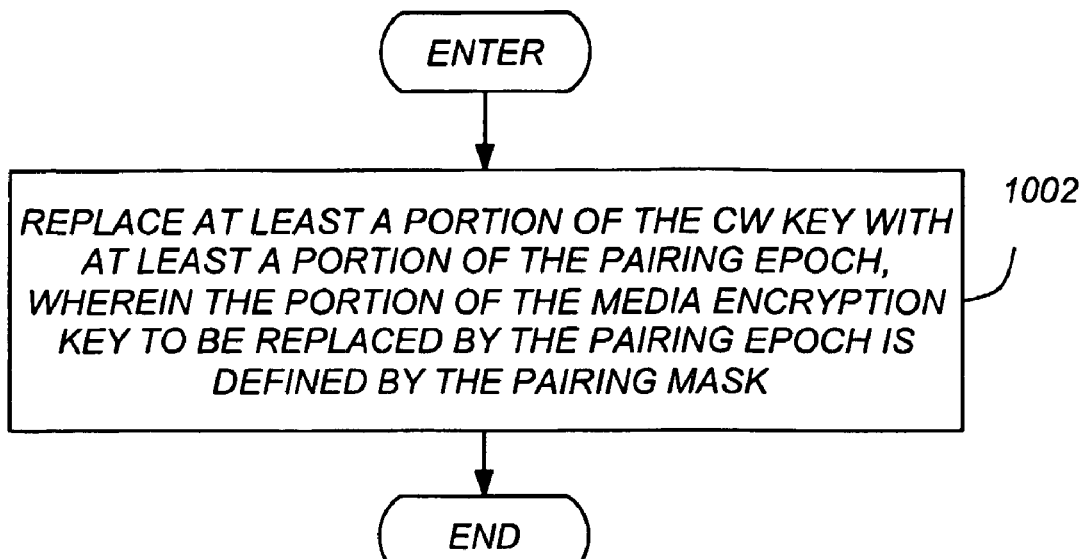
FIG. 10 is a flow chart describing exemplary steps performed in modifying the control word.

FIG. 10 is a flow chart describing one embodiment of how the CW is modified, as shown in block 920 of FIG. 9B. In this embodiment, the first portion of CW is modified by at least a subset of the first portion 702 of the pairing key 512, wherein the subset to be modified is determined according to the second portion 704 of the pairing key 512.

In the embodiment illustrated in FIG. 9B (strong pairing), when the security module 580 processes a CW 536 and the second portion 604 is set to a first value (channel operating in a non-paired or weakly paired mode, or strongly paired with an arbitrary pairing key), the CW 536 is simply provided to an output register for use by the transport module 412, and the media program is thereafter decrypted. However, when strong pairing is required for a particular media program, the control center 102 sets the second portion of the control word to the second value, and sets the first portion 602 of the CW 536 to a different value determined from the pairing key PK. If the CW 536 is modified to a different value by the operations in block 921 of FIG. 9B than is expected by the control center, the resulting CW 536 will not decrypt the media program, and an attempt by a non-authorized CAM 406 or compromised IRD 132 software to bypass strong pairing will be unsuccessful.

Further, if the value for the pairing key PK is not the proper value (e.g. it is an outdated pairing key or the wrong pairing key to view the particular program material), the modified CW 536 will not be the proper value to decrypt the media portion.

Figure 11:
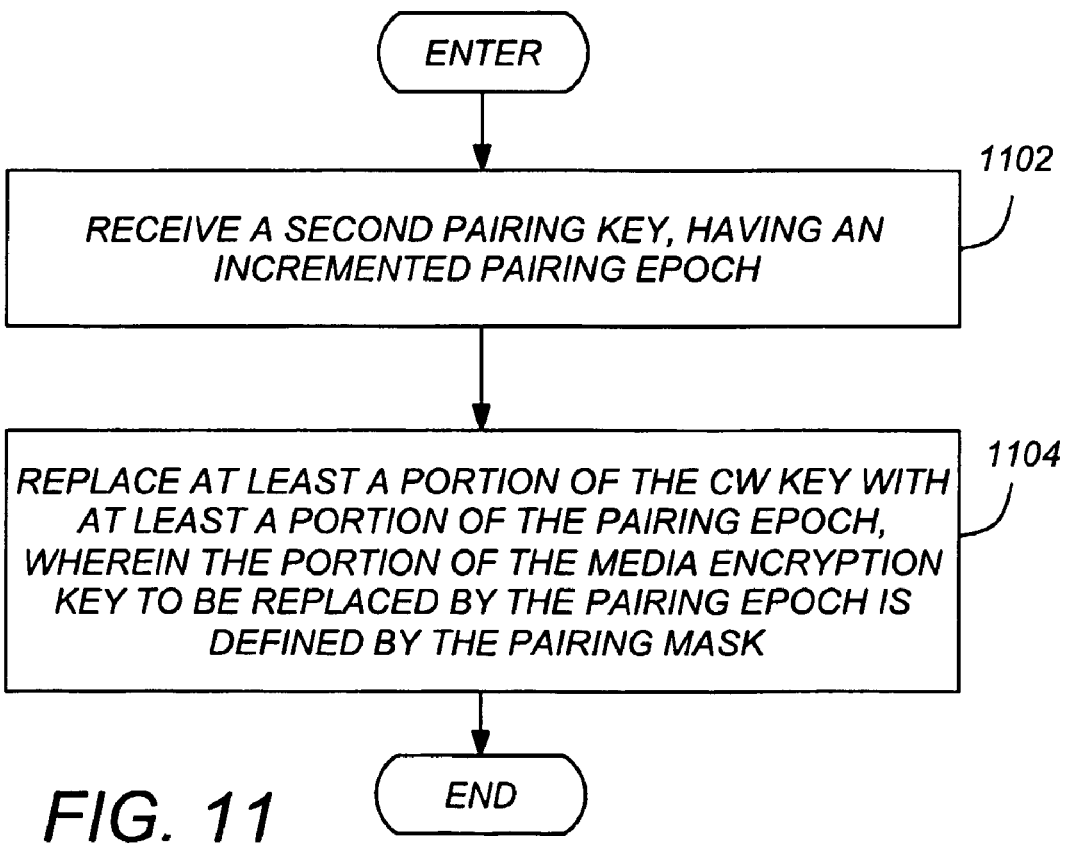
FIG. 11 is a flow chart describing exemplary steps performed in updating the pairing keys on a network basis.

FIG. 11 is a flow chart describing exemplary steps performed in updating the pairing keys on a network basis. As shown in blocks 1102 and 1104, after a second pairing key having an incremented or changed epoch is received, at least a portion of the CW key 536 is replaced with at least a portion of the pairing epoch. As before, the portion of the CW 536 to be replaced or modified is determined from the pairing mask 704. In one embodiment of the invention, the first portion 602 of the CW 536 is the first byte of the CW 536 the first portion 702 of the pairing key 516 is a pairing epoch (PE), and the second portion 704 of the pairing key 516 is the pairing mask (PM) 704.

Strong pairing is intended to prevent unauthorized insertion of the CW 536. A CAM 406 is authorized to operate with an IRD 132, by delivery of a common pairing key (PK) 516 by the control center 102. The possibility exists that the CAM 406 may become compromised, thus exposing the pairing key 516 to compromise. To limit the damage from such exposure, the control center 102 can change the pairing key 516. This can be performed from time to time as a security precaution, or as a revocation procedure. The pairing key may be revoked on an individual basis (e.g. when a subscriber is de-activated) and/or on a network-wide basis, (e.g. after a compromised CAM 406 generation has been completely replaced).

The new pairing key 516 can be delivered to the IRD 132 via satellite 108 or during callback, and an over-the-air signal will specify when the new pairing key 516 must be installed. To reduce reliance on the trusted IRD 132 software, the security module 508 is used to ensure that the appropriate strong pairing key 516 is used. This can be accomplished as described below.

The first portion 702 of the pairing key 516 specifies a network-wide pairing epoch (PE). When the epoch advances (indicating that it is time for the next scheduled update), some or all pairing keys in the network will be changed.

The second portion 704 of the pairing key 516 specifies a pairing mask (PM). The pairing mask byte indicates which bits of the first portion 702 of the CW 536 are to be replaced by the corresponding bits of the PE. This operation is referred to as the Pairing Epoch Mask Function (PEMF).

In one embodiment, the remaining bytes 706 of the pairing key 516 are random, and the entire pairing key 516 is (1) encrypted for delivery to the IRD 132 and CAM 406, and (2) used to encrypt the CW.

After the security module 508 decrypts the encrypted CW 536, using the pairing key 516, the security module 508 checks the value of the second portion 704 of the CW 536 (i.e. the SPF). If the SPF bit is set to a first value, the decrypted CW 536 is placed in the output register for use by the transport module 412 unchanged. If the SPF bit is set to another value, then the security module 508 applies the PEMF to the first portion 702 of the CW 536 before placing the resulting CW in the output register.

When strong pairing is required on a channel, the applicable CW 536 used for scrambling by the control center 102 has a first portion 702 as specified above, i.e. the PEMF will be applied whenever a the second portion of the CW 536 is set to the second value.

Any attempt by a pirate CAM 406 or compromised IRD 132 software to bypass strong pairing by using a pairing key 536 from an earlier epoch will result in incorrect descrambling whenever the second portion 604 (e.g., the SPF bit) of the CW 536 is equal to one.

The strong pairing flag (SPF) provides a method to control whether or not strong pairing is enforced. For channels where no pairing is required (e.g. channels having promotional materials) the SPF is set to the first value. On channels where strong pairing is required, the SPF can be set to the second value, thus ensuring that strong pairing is enforced. The SPF may be held to the first value on all channels during the transition between pairing key generations (thus assuring access during such periods), or when the IRDs 132 supporting strong pairing are first introduced.

The PEMF is a flexible method of binding the pairing key epoch to the CW 536 to enforce strong pairing, in the event that the IRD 132 software has been compromised. This allows for a trade-off between the number of bits of the PE 702 that are bound to the CW 536, and the cryptographic entropy of the resulting CW 536. In an example of a baseline operational mode, the PM 704 may have the first or last N bits set, and the PE 704 has a range of $2^N$ values. When the baseline PEMF is applied, the CW cryptographic entropy is reduced by the inclusion of SPF and PEMF to a lower value. While this mode of operation has reduced the cryptographic strength of the CW 536, effective cryptanalytic attacks on the CW 536 are extremely unlikely, given that the CW is changed frequently. Nevertheless, it is not prudent to permanently reduce the CW cryptographic entropy. The PEMF allows for CW entropy to be increased at any time, by changing the number of bits in the PM 704. This is achieved by a change in the PK 516. When this occurs, the effective number of remaining PK epochs is correspondingly reduced, based on the number of pairing key epochs that have already been issued (strong pairing is only effective in any epoch if the current CW 536 with PEMF applied cannot be emulated even when all previous PK generations have been exposed).

In the limit of the trade-off between strong pairing enforcement and CW cryptographic entropy, a PK 516 with PM=0x00 with random SPF bit will restore full CW cryptographic entropy, at the expense of permanently losing the ability to enforce strong pairing. This is the opposite extreme of the baseline PMEF, which need only be made as a last resort if cryptographic entropy ever becomes overwhelmingly more important than enforcement of strong pairing.

The duty cycle of the SPF provides a second level of flexibility to trade-off between strong pairing enforcement and CW cryptographic entropy. As indicated above, initially the SPF may be set to a first value such that only one bit of cryptographic entropy is lost. In the baseline description above, when strong pairing is enforced with N bits of PM, the cryptographic entropy is reduced by N+1 bits by setting the SPF bit to the second value. A simple operational mechanism to retain the benefits of both ends of the trade-off is to allow the SPF to vary randomly on channels where strong pairing is required. Then on each key period, the resulting CW 536 can have alternating SPF values, hence a desired percentage of the key periods will have PEMF applied to enforce strong pairing; and another percentage of the key periods, the CW will have nearly full cryptographic entropy. If a different duty cycle between these security modes is desired, the control center 102 and associated elements can bias the proportion of SPF values appropriately. For legacy IRD 132 operation, the CAM 406 will replicate the generation of the CW 536 at the control center 102.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of selectively configuring a receiver of a set of receivers to receive a media program encrypted according to a media encryption key and a conditional access module, comprising the steps of:

receiving a media program in the receiver, the media program encrypted by either a media encryption key or a modified media encryption key;

receiving the media encryption key in the receiver, the media encryption key including a first portion indicating a first state in which the media program is to be viewable by a set of receivers or a second state in which the media program is to be viewable only by a subset of the set of receivers;

decrypting the media program in the receiver according to the media encryption key if the first portion indicates the first state; and modifying the media encryption key in the receiver according to a second key stored by only the subset of the set of receivers to produce a modified media encryption key and decrypting the media program according to the modified media encryption key if the first portion indicates the second state.

2. The method of claim 1, wherein the second key is a pairing key and wherein:

the received media encryption key is encrypted by a conditional access module communicatively coupled to the receiver according to the pairing key before being received by the receiver;

the method further comprises the step of decrypting the media encryption key according to the pairing key in the receiver to produce a decrypted media encryption key;

the step of decrypting the media program according to the media encryption key if the first portion indicates the first state comprises the step of decrypting the media program according to the decrypted media encryption key if the first portion indicates the first state; and the step of modifying the media encryption key to produce the modified media encryption key and decrypting the media program according to the modified media encryption key if the portion indicates the second state comprises the step of modifying the decrypted media encryption key to produce the modified media encryption key and decrypting the media program according to the modified media encryption key if the first portion indicates the second state.

3. The method of claim 2, wherein the first portion is a flag.

4. The method of claim 3, wherein:

the media encryption key is received in a security module;

the media program is decrypted in a transport module including a memory cache; and the decrypted media encryption key is provided from the security module to the transport module only by direct memory access the memory cache.

5. The method of claim 2, wherein the pairing key comprises a pairing epoch and a pairing mask, and the step of modifying the decrypted media encryption key comprises the step of:

replacing at least a second portion of the media encryption key with the pairing epoch, wherein the at least a second portion of the media encryption key to be replaced by the pairing epoch is defined by the pairing mask.

6. The method of claim 5, further comprising the steps of:

receiving a second pairing key, the second pairing key including an incremented pairing epoch; and replacing at least a third portion of the media encryption key with the second pairing epoch.

7. The method of claim 6, wherein the second pairing key further comprises a second pairing mask, and the at least a second portion of the media encryption key to be replaced with the incremented pairing epoch is defined according to the second pairing mask.

8. The method of claim 2, further comprising the steps of:

receiving the pairing key encrypted according to an I/O indecipherable algorithm;

decrypting the pairing key according to the I/O indecipherable algorithm;

storing the pairing key in the conditional access module; and securely transmitting the pairing key in the receiver.

9. A method of selectively pairing a receiver configured to receive a media program encrypted according to a media encryption key and a conditional access module, comprising the steps of:

transmitting the media encryption key to the receiver via the conditional access module, the media encryption key including a first portion indicating a first state in which the media program is to be viewable by using a set of receivers or a second state in which the media program is to be viewable only by a subset of the set of receivers;

transmitting a pairing key to the conditional access module and to the receiver via the conditional access module;

wherein the media encryption key is encrypted in the conditional access module according to the pairing key before being provided to the receiver and decrypted in the receiver according to the pairing key;

wherein the transmitted pairing key comprises a pairing epoch and a pairing mask, the pairing key being encrypted according to an indecipherable algorithm implemented in the conditional access module; and transmitting the media program encrypted according to the media encryption key;

wherein the first state commands the receiver to decrypt the media program according to the media encryption key, and the second state commands the receiver to modify the media encryption key and decrypt the media program according to the modified media encryption key; and wherein the media encryption key is modified by replacing at least a second portion of the media encryption key with the pairing epoch, the at least a portion of the media encryption key to be replaced being defined by the pairing mask.

10. The method of claim 9, wherein the first portion is a flag.

11. The method of claim 9, further comprising the steps of:

transmitting a second pairing key including an incremented pairing epoch.

12. The method of claim 11, wherein the second pairing key further comprises a second pairing mask, and the at least a second portion of the media encryption key to be replaced with the incremented pairing epoch is defined according to the second pairing mask.

13. A receiver, configurable to selectively receive a media program, the receiver being one of a set of receivers, comprising:

means for receiving a media program encrypted by either a media encryption key or a modified media encryption key;

means for receiving the media encryption key, the media encryption key including a first portion indicating a first state in which the media program is to be viewable by a set of receivers or a second state in which the media program is to be viewable only by a subset of the set of receivers;

means for decrypting the media program according to the media encryption key if the first portion indicates the first state; and means for modifying the media encryption key according to a second key stored by only a subset of the set of receivers to produce a modified media encryption key and decrypting the media program according to the modified media encryption key if the first portion indicates the second state.

14. The receiver of claim 13, wherein the second key is a pairing key and wherein:
the received media encryption key is encrypted by a conditional access module communicatively coupled to the receiver according to the pairing key before being received;
the receiver further comprises means for decrypting the media encryption key according to the pairing key to produce a decrypted pairing key;
the means for decrypting the media program according to the media encryption key if the first portion indicates the first state comprises means for decrypting the media program according to the decrypted media encryption key if the first portion indicates the first state; and
the means for modifying the media encryption key to produce the modified media encryption key and decrypting the media program according to the modified media encryption key if the first portion indicates the second state comprises means for modifying the decrypted media encryption key to produce the modified media encryption key and decrypting the media program according to the modified media encryption key if the first portion indicates the second state.

15. The receiver of claim 14, wherein the first portion is a flag.

16. The receiver of claim 14, wherein the pairing key comprises a pairing epoch and a pairing mask, and the means for modifying the decrypted media encryption key comprises:
means for replacing at least a second portion of the media encryption key with the pairing epoch, wherein the at least a second portion of the media encryption key to be replaced by the pairing epoch is defined by the pairing mask.

17. The receiver of claim 16, further comprising:
means for receiving a second pairing key, the second pairing key including an incremented pairing epoch; and
means for replacing at least a third portion of the media encryption key with the second pairing epoch.

18. The receiver of claim 17, wherein the second pairing key further comprises a second pairing mask, and the at least a third portion of the media encryption key to be replaced with the incremented pairing epoch is defined according to the second pairing mask.

19. The receiver of claim 16, wherein:
the media encryption key is received in a security module;
the media program is decrypted in a transport module including a memory cache; and
the decrypted media encryption key is provided from the security module to the transport module only by direct memory access the memory cache.

20. The receiver of claim 14, further comprising:
means for receiving the pairing key encrypted according to an I/O indecipherable algorithm;
means for decrypting the pairing key according to the I/O indecipherable algorithm;
means for storing the pairing key in the conditional access module; and
means for securely transmitting the pairing key in the receiver.

21. A receiver configurable to receive a media program encrypted according to a media encryption key if the media program is to be viewable by a set of receivers and according to a modified encryption key if the media program is to be viewable by a subset of the set of receivers, comprising:
means for transmitting a media encryption key to the receiver via the conditional access module, the media encryption key including a first portion indicating a first state in which the media program is to be viewable using all receivers or a second state in which the media program is to be viewable using only receivers paired with the conditional access module;
means for transmitting a pairing key to the conditional access module and to the receiver via the conditional access module only if the receiver is one of the subset of the set of receivers, wherein the transmitted pairing key comprises a pairing epoch and a pairing mask, the pairing key being encrypted according to an indecipherable algorithm implemented in the conditional access module; and
means for transmitting the media program encrypted according to the media encryption key;
wherein the first state commands the receiver to decrypt the media program according to the media encryption key, and the second state commands the receiver to modify the media encryption key and decrypt the media program according to the modified media encryption key; and
wherein the media encryption key is modified by replacing at least a second portion of the media encryption key with the pairing epoch, the at least a second portion of the media encryption key to be replaced being defined by the pairing mask.

22. The receiver of claim 21, wherein the first portion is a pairing flag.

23. The receiver of claim 21, further comprising:
means for transmitting a second pairing key including an incremented pairing epoch.

24. The receiver of claim 23, wherein the second pairing key further comprises a second pairing mask, and a third portion of the media encryption key is replaced with the incremented pairing epoch as defined according to the second pairing mask.

25. An receiver, configurable to selectively receive a media program encrypted according to a media encryption key if the media program is to be viewable by a set of receivers and according to a modified media encryption key if the media program is to be viewable by a subset of the set of receivers, comprising:
a security module, for receiving a media encryption key from the conditional access module, wherein the media encryption key has a first portion indicating a first state in which the media program is to be viewable by a set of receivers or a second state in which the media program is to be viewable only by a subset of the set of receivers, the security module including:
a module for modifying the media encryption key according to a second key stored only by the subset of receivers to produce a modified media encryption key if the first portion indicates the second state; and
a transport module, comprising a decryptor for decrypting the media program according to the media encryption key if the first portion indicates the first state and for decrypting the media program according to a modified media encryption key if the first portion indicates the second state.

26. The receiver of claim 25, wherein the second key is a pairing key and wherein:
the received media encryption key is encrypted by a conditional access module communicatively coupled to the receiver according to the pairing key before being received by the receiver; and the security module further comprises a decryptor for decrypting the encrypted media encryption key according to the pairing key to produce a decrypted media encryption key.

27. The receiver of claim 26, wherein the first portion is a flag.

28. The receiver of claim 26, wherein the pairing key comprises a pairing epoch and a pairing mask, and the module for modifying the decrypted media encryption key comprises:
   means for replacing at least a second portion of the media encryption key with the pairing epoch, wherein the at least a second portion of the media encryption key to be replaced by the pairing epoch is defined by the pairing mask.

29. The receiver of claim 28, wherein:
   the receiver further receives a second pairing key, the second pairing key including an incremented pairing epoch; and
   the security module further replaces at least a third portion of the media encryption key with the second pairing epoch.

30. The receiver of claim 29, wherein the second pairing key further comprises a second pairing mask, and the third portion of the media encryption key to be replaced with the incremented pairing epoch is defined according to the second pairing mask.

31. The receiver of claim 26, further comprising:
   a means for receiving the pairing key encrypted according to an I/O indecipherable algorithm and for providing the encrypted pairing key to the conditional access module; and
   a conditional access module for decrypting the pairing key according to the I/O indecipherable algorithm, for storing the pairing key therein and for transmitting the pairing key to the receiver.

32. The receiver of claim 26, wherein:
   the transport module includes a memory cache; and
   the decrypted media encryption key is provided from the security module to the transport module only by direct memory access the memory cache.

33. An apparatus for selectively commanding a receiver of a set of receivers to receive a media program encrypted according to a media encryption key if the media program is to be viewable by the set of receivers and encrypted according to a modified encryption key if the media program is to be viewable by only a subset of the set of receivers, comprising:
   a transmitter for transmitting a media encryption key, wherein:
      the media encryption key is encrypted according to an I/O indecipherable algorithm implemented in the conditional access module; and
      the media encryption key includes a first portion indicating a first state in which the media program is to be viewable by a set of receivers or a second state in which the media program is to be viewable only by a subset of the set of receivers.

34. The apparatus of claim 33, wherein the transmitter further transmits a second key encrypted according to the I/O indecipherable algorithm.

35. The apparatus of claim 34, wherein the first portion is a flag.

36. The apparatus of claim 34, wherein:
   the second key is transmitted the conditional access module and to the receiver via the conditional access module; and
   the media encryption key is transmitted to the receiver via the conditional access module.

37. The apparatus of claim 34, wherein the second key is a pairing key stored only by the subset of the set of receivers and wherein:
   the apparatus further comprises:
      a conditional access module for receiving the media encryption key, decrypting the media encryption key re-encrypting the media encryption key according to the pairing key;
      a receiver for receiving the re-encrypted media encryption key and for decrypting the re-encrypted media encryption key according to the pairing key; and
   the first state commands the receiver to decrypt the media program according to the media encryption key; and
   the second state commands the receiver to modify the decrypted media encryption key according to the pairing key and decrypt the media program according to the modified media encryption key.

38. The apparatus of claim 37, wherein:
   the pairing key comprises a pairing epoch and a pairing mask; and
   the second state commands the receiver to modify the decrypted media encryption key by replacing at least a second portion of the media encryption key with the pairing epoch, wherein the at least a second portion of the media encryption key to be replaced by the pairing epoch is defined by the pairing mask.

39. The apparatus of claim 38, wherein the transmitter further transmits a second pairing key encrypted according to the indecipherable algorithm implemented in the conditional access module, the second pairing key comprising an incremented pairing epoch.

40. The apparatus of claim 39, wherein the second pairing key further comprises a second pairing mask, and a third portion of the media encryption key is replaced with the incremented pairing epoch as defined according to the second pairing mask.

* * * * *

UNITED STATES PATENT AND TRADEMARK OFFICE
CERTIFICATE OF CORRECTION

| | | |
|---|---|---|
| PATENT NO. | : 7,797,552 B2 | Page 1 of 1 |
| APPLICATION NO. | : 10/490261 | |
| DATED | : September 14, 2010 | |
| INVENTOR(S) | : Kahn et al. | |

It is certified that error appears in the above-identified patent and that said Letters Patent is hereby corrected as shown below:

On title page Item (73) Assignees, replace "NDS Group Ltd., Middlesex (GB)" with "NDS Limited, Middlesex (GB)".

Signed and Sealed this
Ninth Day of August, 2011

David J. Kappos
*Director of the United States Patent and Trademark Office*